(12) United States Patent
 Colin

(10) Patent No.: US 9,958,530 B2
(45) Date of Patent: May 1, 2018

(54) DISTRESS BEACON INTEGRATED IN THE VERTICAL TAILPLANE OF AN AIRCRAFT

(71) Applicant: Airbus Operations (SAS), Toulouse (FR)

(72) Inventor: Michel Colin, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 399 days.

(21) Appl. No.: 14/534,390

(22) Filed: Nov. 6, 2014

(65) Prior Publication Data

US 2015/0130663 A1    May 14, 2015

(30) Foreign Application Priority Data

Nov. 12, 2013  (FR) ...................................... 13 61029

(51) Int. Cl.
| | |
|---|---|
| *G01S 1/00* | (2006.01) |
| *G01S 5/02* | (2010.01) |
| *B64D 25/20* | (2006.01) |
| *G01S 19/17* | (2010.01) |
| *B64D 45/00* | (2006.01) |

(52) U.S. Cl.
 CPC ............ *G01S 5/0231* (2013.01); *B64D 25/20* (2013.01); *B64D 2045/0065* (2013.01); *G01S 19/17* (2013.01)

(58) Field of Classification Search
 CPC ....... G01S 5/0231; G01S 19/17; B64D 25/20; B64D 2045/0065
 USPC .............. 342/385; 701/14; 340/981
 See application file for complete search history.

(56) References Cited

U.S. PATENT DOCUMENTS

| | | | | |
|---|---|---|---|---|
| 2,552,969 | A |   | 5/1951  | Holman |
| 2,959,671 | A | * | 11/1960 | Stevinson ............... B64D 25/20 |
| | | | | 244/1 R |
| 3,140,847 | A | * | 7/1964  | Ames, Jr. ............... B64D 45/00 |
| | | | | 244/1 R |
| 3,566,235 | A | * | 2/1971  | Rose ...................... H01Q 1/283 |
| | | | | 343/705 |
| 3,882,394 | A | * | 5/1975  | Koster ................... H04B 1/034 |
| | | | | 455/127.1 |
| 3,978,410 | A | * | 8/1976  | Fletcher ................. H04B 1/034 |
| | | | | 343/705 |
| 4,376,421 | A | * | 3/1983  | Skinner .................... G08B 5/40 |
| | | | | 116/211 |
| 4,468,440 | A | * | 8/1984  | Evjen .................... H01M 10/63 |
| | | | | 429/120 |
| 6,260,508 | B1| * | 7/2001  | Morse ................... G08B 5/002 |
| | | | | 116/211 |

(Continued)

FOREIGN PATENT DOCUMENTS

| | | |
|---|---|---|
| DE | 102011016208 | 10/2012 |
| FR | 2976913      | 12/2012 |

OTHER PUBLICATIONS

French Search Report, Jul. 3, 2014.

*Primary Examiner* — Chuong P Nguyen
(74) *Attorney, Agent, or Firm* — Greer, Burns & Crain, Ltd.

(57) ABSTRACT

The vertical tailplane of the aircraft is equipped with a distress beacon. The floatability of the vertical tailplane is taken advantage of in order to keep the distress beacon on the surface of the water in the case of an accident caused by a forced landing on the sea.

8 Claims, 2 Drawing Sheets

(56) References Cited

U.S. PATENT DOCUMENTS

| | | | | |
|---|---|---|---|---|
| 8,493,715 B1* | 7/2013 | Angelucci | ............. | B64D 45/00 |
| | | | | 244/1 R |
| 8,687,375 B2* | 4/2014 | Uy | ........................ | G01D 11/24 |
| | | | | 361/754 |
| 8,706,357 B1* | 4/2014 | van den Heuvel | .... | B64D 45/00 |
| | | | | 701/14 |
| 8,880,283 B2* | 11/2014 | Kaufmann | ............. | B64D 25/20 |
| | | | | 369/21 |
| 9,187,183 B2* | 11/2015 | Argillier | ................ | B64D 45/00 |
| 9,296,489 B2* | 3/2016 | van den Heuvel | .... | B64D 45/00 |
| 9,308,828 B2* | 4/2016 | Wu | ........................ | B60L 1/003 |
| 9,738,398 B1* | 8/2017 | Wang | .................... | B64D 45/00 |
| 2003/0164769 A1* | 9/2003 | Ceccom | ................ | G01S 5/0231 |
| | | | | 340/573.1 |
| 2008/0090137 A1* | 4/2008 | Buck | ................... | H01M 2/1077 |
| | | | | 429/120 |
| 2010/0063654 A1* | 3/2010 | Winterhalter | .......... | B64D 45/00 |
| | | | | 701/14 |
| 2011/0080285 A1* | 4/2011 | Howson | .................... | G01S 3/40 |
| | | | | 340/540 |
| 2012/0138741 A1* | 6/2012 | Fabre | .................... | G01S 5/0231 |
| | | | | 244/1 R |
| 2012/0166037 A1* | 6/2012 | Vinue Santolalla | ... | B64D 45/00 |
| | | | | 701/32.2 |
| 2012/0299776 A1* | 11/2012 | Lee | ........................... | B63C 9/00 |
| | | | | 342/386 |
| 2014/0142803 A1 | 5/2014 | Argillier et al. | | |
| 2016/0257415 A1* | 9/2016 | Ye | ........................ | B64D 45/00 |
| 2016/0257421 A1* | 9/2016 | Ye | ........................ | B64D 45/00 |

\* cited by examiner

US 9,958,530 B2

DISTRESS BEACON INTEGRATED IN THE VERTICAL TAILPLANE OF AN AIRCRAFT

CROSS-REFERENCES TO RELATED APPLICATIONS

This application claims the benefit of the French patent application No. 1361029 filed on Nov. 12, 2013, the entire disclosures of which are incorporated herein by way of reference.

BACKGROUND OF THE INVENTION

The invention relates to the field of distress beacons installed on aircraft, these beacons also being known by the English acronym ELT (Emergency Locator Transmitter).

The invention more particularly relates to the improvement of the locating of an aircraft in the case of an accident caused by a forced landing on the sea.

It applies more particularly, but not exclusively, to the field of commercial aircraft.

Existing aircraft are equipped with a distress beacon which makes it possible to locate them in the case of an accident. Usually, in the case of a rapid deceleration or of an impact, this beacon typically transmits a 406 MHz radio signal which is detected by geostationary satellites.

This beacon is generally installed in the fuselage of the aircraft and has an external antenna for the transmission of the radio signal. This type of arrangement correctly meets the requirement in the case of an accident on land.

On the other hand, in the case of a forced landing on the sea, the aircraft often sinks rapidly. The distress signal is then taken with the aircraft towards the seabed. If the fuselage lies at a great depth, the signal transmitted by the beacon may not be powerful enough to reach the satellites. It then becomes difficult to locate the approximate position of the aircraft.

There is therefore a desire to improve the locating of an aircraft is the case of an accident caused by a forced landing on the sea.

SUMMARY OF THE INVENTION

In order to address this problem, an aspect of the invention provides a vertical tailplane of an aircraft, this tailplane being equipped with a distress beacon, the tailplane comprising a housing for receiving the distress beacon, closed by a radome forming an aerodynamic surface transparent to the waves likely to the transmitted by the beacon, the housing being hermetically sealed and maintained at a predefined pressure, called the internal pressure, preferably higher than 1 bar. This particular arrangement allows the distress beacon to operate for a longer time and with better performance after the accident and thus facilitates the locating of the aircraft.

The invention can also exhibit one or more of the following optional features.

The distress beacon comprises a float.

The distress beacon comprises a battery and a heating unit provided for maintaining the battery at a temperature higher than a reference temperature.

The battery and the heating unit are powered by an electrical power supply of the aircraft, via a non-wired electrical connector.

The distress beacon is held in its housing by water-soluble fixing devices.

The distress beacon is arranged inside the leading edge of the vertical tailplane.

The radome is equipped with one or more privileged fracture zones.

The invention also relates to an aircraft comprising a vertical tailplane such as described above.

Other advantages and features of the invention will appear in the following detailed and non-limiting description.

BRIEF DESCRIPTION OF THE DRAWINGS

This description will be given with reference to the appended drawings among which.

DETAILED DESCRIPTION OF THE PREFERRED EMBODIMENTS

Figure 1:
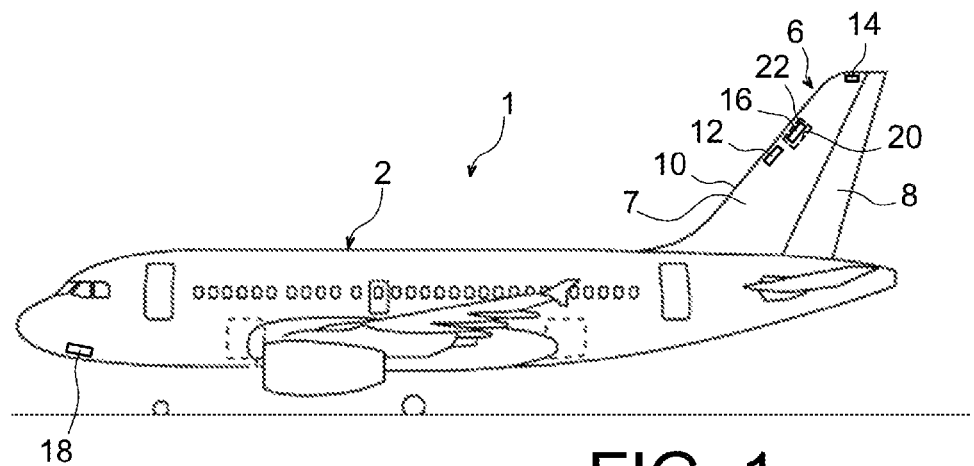
FIG. 1 shows a side view of an aircraft comprising a vertical tailplane according to a preferred embodiment of the invention.

Referring firstly to FIG. 1, there is shown an aircraft 1 comprising a fuselage 2 and a vertical tailplane 6 according to a preferred embodiment of the invention.

The vertical tailplane 6, also called the vertical stabilizer or tail fin, comprises a fixed front structural part 7 and a rudder 8 articulated on the fixed structural part 7, at the trailing edge of the latter.

The fixed part 7 of the vertical tailplane 6 houses several items of equipment:

a first HF radio antenna 12 for receiving and transmitting. This passive antenna 12 is housed in a leading edge 10 of the tailplane 6; and a second VOR radio-navigation antenna 14. This passive antenna 14 is situated at the top of the fixed part 7 of the vertical tailplane 6.

These two antennas 12, 14, are protected from the exterior by covers made of material that is transparent to electromagnetic waves in the HF and VOR ranges.

The fixed part 7 houses a distress beacon 16, also called an ELT beacon. This beacon 16 is, in the example shown in FIG. 1, installed in the leading edge 10 of the vertical tailplane 6, close to the first antenna 12. This distress beacon can be provided in addition to a similar distress beacon 18, installed in the fuselage 2 as is known in the prior art. In the case of an accident, provision is then made to trigger both of the beacons simultaneously in order to increase the chances of locating the aircraft.

Figure 2:
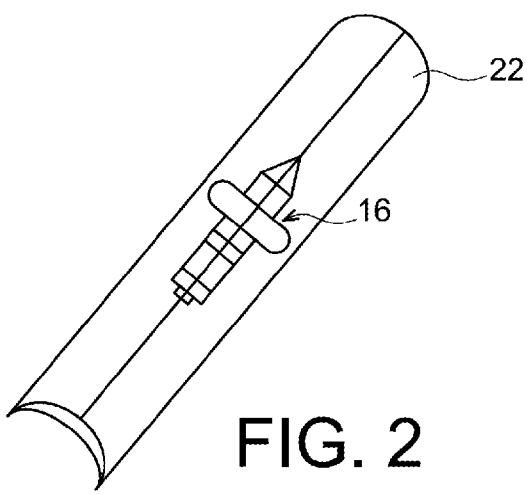
FIG. 2 shows a perspective view of the distress beacon installed on the vertical tailplane shown in the preceding figure and covered by a radome.

The distress beacon 16 is placed in a hermetically sealed receiving housing 20, provided on the leading edge 10 of the vertical tailplane. This housing 20 is closed by a radome 22 shown in FIG. 2. The radome 22, also called a cover, forms with its outer surface an aerodynamic surface reconstituting the missing part of the leading edge 10, at the level of the housing 20. The hermetically sealed housing 20 encloses, in addition to the distress beacon 16, a volume of air at a predefined pressure, called the internal pressure. The internal pressure, higher than 1 bar, applies a radial force, directed towards the exterior, on an inner surface of the radome. Preferably, the internal pressure chosen is of the order of 2 to 7 bars and, even more preferably, of the order of 3 bars.

Figure 2A:
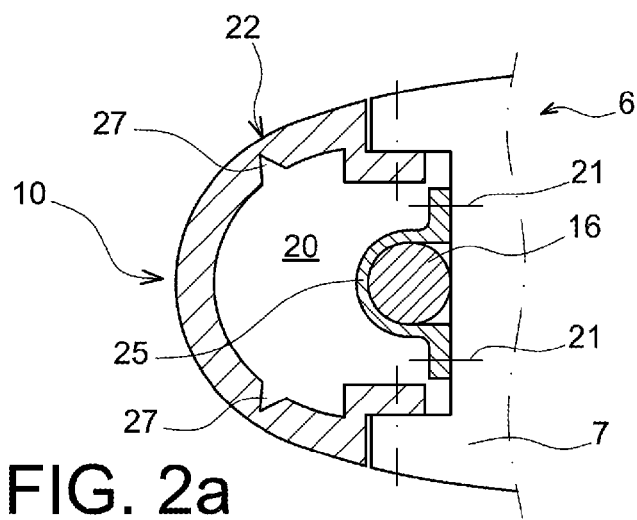
FIG. 2a shows an enlarged cross-sectional view of a portion of the leading edge of the vertical tailplane housing the distress beacon.

Referring more particularly to FIG. 2a, the distress beacon 16 is held fixed in the housing 20 by means of water-soluble fixing devices 21, for example made of water-soluble plastic material. These fixing devices 21 for example connect a clamping collar 25 to the fixed structure 7, the collar surrounding the beacon 16.

In its constitution, the radome 22 is transparent to the waves likely to be transmitted by the beacon 16. By way of indication, a material transparent to the waves in the UHF range is used, given that the distress beacon 16 is preferably designed to transmit a 406 MHz radio signal.

Moreover, the radome 22 is equipped with one or more privileged fracture zones 27, preferably two compressive fracture zones arranged on the outer surface of the radome, or on its inner surface in order to limit the aerodynamic disturbances. The resistance of the radome to compression is reduced at the level of each fracture zone 27. The fracture zones can be of different kinds but they are preferably grooves, for example V-shaped ones.

Figure 3:
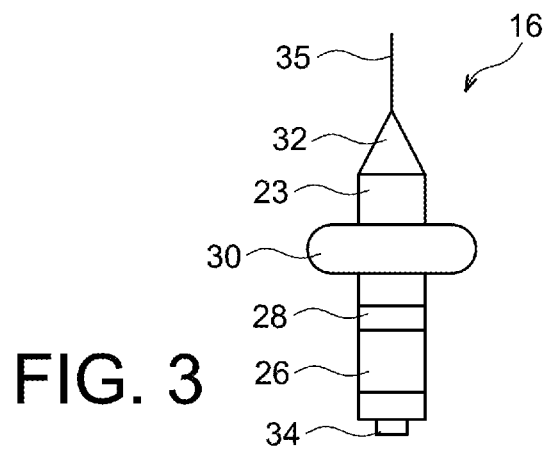
FIG. 3 shows, in a more detailed manner, an example embodiment of the distress beacons shown in the preceding figures.
Figure 4:
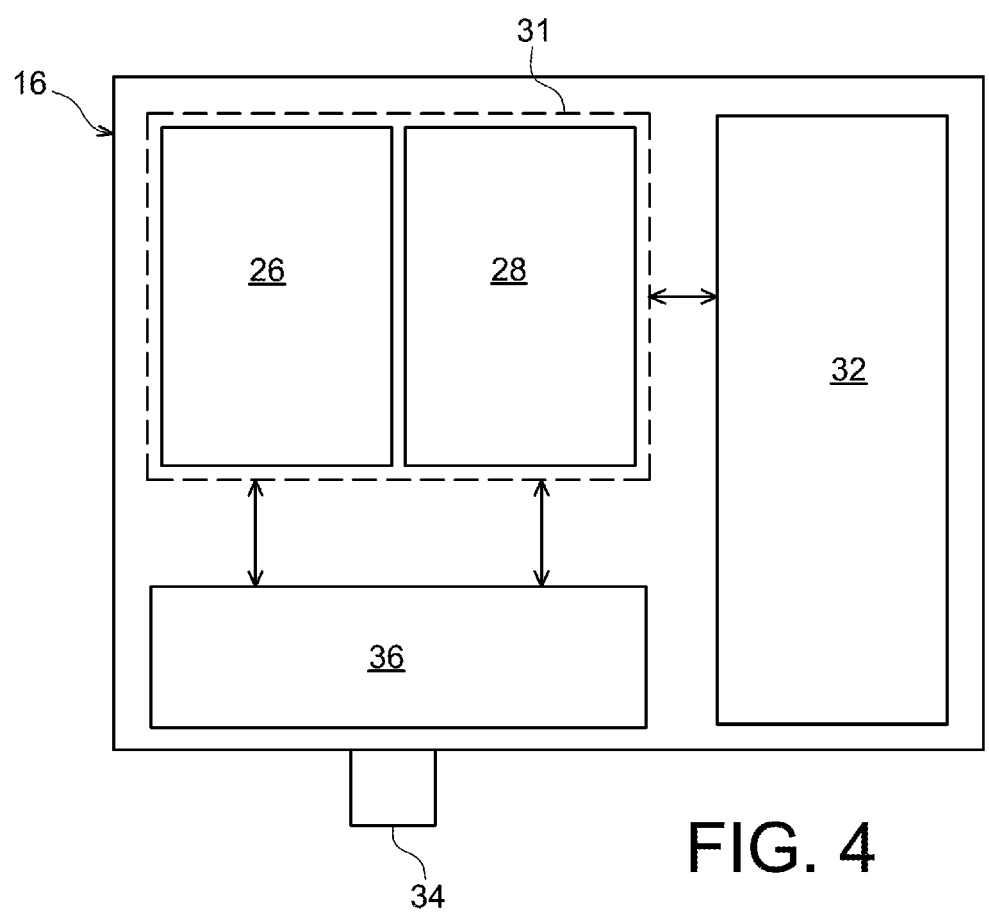
FIG. 4 is a block diagram showing certain constituent elements of the distress beacon shown in the preceding figures.

Referring now to FIGS. 3 and 4, a detailed example of the distress beacon 16 is shown. The latter comprises a body 23 enclosing a non-wired electrical connector 34, a battery 28, a unit 26 for heating the battery, a float 30, a power supply and charging circuit 36 and a locating transmitter 32 connected to a transmitting antenna 35 and to the battery 28.

FIG. 4 more particularly is a block diagram of an electrical circuit diagram of the distress beacon 16.

The non-wired electrical connector 34, for example an induction power supply, electrically connects the power supply and charging circuit 36 to a power supply circuit of the aircraft when the distress beacon is arranged in the hermetically sealed receiving housing 20.

The power supply and charging circuit 36 comprises a central processing unit and sensors, the central processing unit activating or deactivating components of the distress beacon 16 as a function of data received through sensors. The power supply and charging circuit 36 is electrically connected to the battery 28 and to the heating unit 26 and receives an electrical current coming from the power supply of the aircraft.

The power supply and charging circuit 36 makes it possible to maintain the battery 28 at the constant voltage and thus provides charging and discharging cycles in order to maintain the battery at an optimum operating level.

Moreover, the power supply and charging circuit 36 supplies an electrical current to the heating unit 26 so that, during flight at high altitude, the battery 28 is maintained at a temperature higher than a reference temperature in order not to degrade its performance. This reference temperature can be of the order of 10° C. For this purpose, the power supply and charging circuit 36 contains a temperature sensor making it possible to measure the temperature of the environment in which the battery is placed, that is to say the air contained inside the hermetically sealed housing 20.

The power supply and charging circuit 36 comprises moreover current and voltage sensors making it possible to detect the presence of the electrical current coming from the aircraft. In the case where there is no more current coming from the aircraft over a predetermined time, for example approximately 30 s, which can typically occur after an accident, the power supply and charging circuit 36 deactivates the heating unit 26 and activates the power supply of the locating transmitter 32 by the battery 28. The locating transmitter then transmits, via the antenna 35, a radio signal that can be detected by geostationary satellites and rescue crews.

With regard to the float 30, this serves to obtain the floatation of the distress beacon 16 in the case where the latter would be ejected from the vertical tailplane 6 in the case of an accident.

In fact, in the case of an accident of the aircraft caused by a forced landing on the sea, the vertical tailplane 6 tends to sink if it is not detached from the fuselage. After such an accident, the distress beacon 16 is therefore taken to the seabed with the tailplane 6. When the latter is immersed, the water applies a pressure on the radome 22. The latter resists compression down to a depth where the internal pressure inside the housing 20 is no longer sufficient to counter the pressure applied by the water column. When the compressive force applied on the radome is too high, the radome fractures at the level of the fracture zones 27 shown in FIG. 2a, thus releasing the distress beacon 16, which rises to the surface due to its float 30. This rising to the surface takes place of course after the dissolving of the fixing devices 21 of the distress beacon.

Once it has risen to the surface, the distress beacon can thus transmit a radio signal whose power is not diminished by the depth of water to be passed through and searches for the device are therefore facilitated.

Conventional calculating software product make it possible to calculate precisely the characteristics of the radome (material, thickness, depth and width of the fracture zone or zones 27) and the internal pressure existing inside the housing 20, in order that the radome 22 fractures at the level of its fracture zones 27 at the desired depth.

It is furthermore noted that, in the case of an accident of the aircraft caused by a forced landing on the sea, the vertical tailplane 6 can also become detached from the fuselage and float on the surface of the water for several hours. After such an accident, the distress beacon 16 according to the invention therefore remains present on the surface of the water due to the floatability of the vertical tailplane, judiciously taken advantage of in the context of this invention. In this case, the presence of the hermetically sealed housing 20 contributes to the floatability of the vertical tailplane 6. The distress beacon 16 then transmits a radio signal that can be detected easily by crews searching for the device.

Various modifications can of course be applied by those skilled in the art to the invention that has just been described solely by non-limiting examples.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A vertical tailplane of an aircraft, comprising:
   a distress beacon being generally cylindrical in shape with a generally circular cross-section and a generally cylindrical exterior side-surface,
   a fixing device that is water-soluble, wherein said fixing device forms a clamping collar that engagees the generally cylindrical exterior side-surface of the distress beacon, a housing for receiving the distress beacon and the fixing device within said housing, said housing is closed by a radome forming an aerodynamic surface transparent to the waves likely to the transmitted by the beacon, said housing being hermetically sealed and maintained at a predefined internal pressure;

wherein the distress beacon comprises a battery and a heating unit provided for maintaining the battery at a temperature higher than a reference temperature;

wherein the radome forms a leading edge of the vertical tailplane.

2. The vertical tailplane as claimed in claim 1, wherein the distress beacon comprises a float.

3. The vertical tailplane as claimed in claim 1, wherein the internal pressure is higher than 1 bar.

4. The vertical tailplane as claimed in claim 1, wherein said distress beacon is held in its housing by water-soluble fixing devices.

5. The vertical tailplane as claimed in claim 1, wherein the distress beacon is arranged inside the radome in the leading edge of the vertical tailplane.

6. The vertical tailplane as claimed in any one of the preceding claims, wherein said radome is equipped with one or more privileged fracture zones.

7. An aircraft comprising a vertical tailplane, the tailplane comprising:

a distress beacon being generally cylindrical in shape with a generally circular cross-section and a generally cylindrical exterior side-surface, a fixing device that is water-soluble, wherein said fixing device forms a clampling collar that engages the generally cylindrical exterior side-surface of the distress beacon, a housing for receiving the distress beacon and the fixing device within said housing, said housing is closed by a radome forming an aerodynamic surface transparent to the waves likely to the transmitted by the beacon, said housing being hermetically sealed and maintained at a predefined internal pressure;

wherein the distress beacon comprises a battery and a heating unit provided for maintaining the battery at a temperature higher than a reference temperature;

wherein the radome forms a leading edge of the vertical tailplane.

8. An aircraft comprising a vertical tailplane, the tailplane comprising:

a distress beacon being generally cylindrical in shape with a generally circular cross-section and a generally cylindrical exterior side-surface, a fixing device that is water-soluble, wherein said fixing device forms a clamping collar that engages the generally cylindrical exterior side-surface of the distress beacon, a housing for receiving the distress beacon and the fixing device within said housing, said housing is closed by a radome forming an aerodynamic surface transparent to the waves likely to the transmitted by the beacon, said housing being hermetically sealed and maintained at a predefined internal pressure;

wherein the distress beacon comprises a battery and a heating unit provided for maintaining the battery at a temperature higher than a reference temperature;

wherein the radome forms a leading edge of the vertical tailplane;

wherein the radome is equipped with one or more privileged fracture zones such that a portion of the leading edge of the vertical tailplane is fracturably removable.

* * * * *